(12) United States Patent
Watson et al.

(10) Patent No.: US 11,451,586 B2
(45) Date of Patent: Sep. 20, 2022

(54) NETWORK SECURITY ATTACK MISDIRECTION ON A TRANSPORT VEHICLE

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Irvine, CA (US)

(*) Notice: Subject to any disclaimer, the term of this patent is extended or adjusted under 35 U.S.C. 154(b) by 844 days.

(21) Appl. No.: 16/115,948

(22) Filed: Aug. 29, 2018

(65) Prior Publication Data

US 2020/0076849 A1    Mar. 5, 2020

(51) Int. Cl.
*H04L 9/40* (2022.01)
*H04W 12/08* (2021.01)
*H04W 4/42* (2018.01)

(52) U.S. Cl.
CPC .......... *H04L 63/1491* (2013.01); *H04L 63/10* (2013.01); *H04L 63/1466* (2013.01); *H04W 4/42* (2018.02); *H04W 12/08* (2013.01)

(58) Field of Classification Search
CPC . H04L 63/1491; H04L 63/10; H04L 63/1466; H04W 4/42; H04W 12/08
USPC .......................................................... 726/23
See application file for complete search history.

(56) References Cited

U.S. PATENT DOCUMENTS

| 8,402,268 B2 | 3/2013 | Dierickx |
| 9,938,019 B2 | 4/2018 | Floyd et al. |
| 10,142,365 B2 | 11/2018 | Grubel et al. |
| 2011/0154108 A1* | 6/2011 | Candia .................. H04L 49/201 714/25 |
| 2016/0330229 A1 | 11/2016 | Watson et al. |
| 2016/0340055 A1* | 11/2016 | Floyd ................. B64D 45/0015 |
| 2017/0041331 A1* | 2/2017 | Craig .................. H04L 63/1441 |
| 2017/0270721 A1* | 9/2017 | Graafstra ............... G07C 9/257 |
| 2018/0124040 A1* | 5/2018 | Watson ................... H04L 63/18 |
| 2018/0375897 A1* | 12/2018 | Kawasaki ........... H04L 63/1491 |

OTHER PUBLICATIONS

Yuill, Jim et al., Honeyfiles: Deceptive Files for Instrusion Detection, Proceedings of the 2004 IEEE Workshop on Information Assurance United States Military Academy, Jun. 10-11, 2004, pp. 116-122, West Point, NY.

Yuill, Jim; Zappe, Mike; Denning, Dorothy; Freer, Fred; "Honeyfiles: Deceptive Files for Intrusion Detection" Proceedings of the 2004 IEEE, Workshop of Information Assurance, United States Military Academy, West Point, NY Jun. 10-11.

* cited by examiner

*Primary Examiner* — Michael S McNally
(74) *Attorney, Agent, or Firm* — Perkins Coie LLP (57) ABSTRACT

A network security attack misdirection line-replaceable unit for installation on an aircraft and connected to an onboard data network include a local network interface to the onboard data network. A local simulation server accepts incoming access requests accompanied by an access credential from an attacker client device, and is responsive thereto with either a simulated access denial response or a simulated access grant response. Delays between receipt of the access request and to the access denial response is progressively increased with each presentation of the access credential.

18 Claims, 3 Drawing Sheets

NETWORK SECURITY ATTACK MISDIRECTION ON A TRANSPORT VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to data communications, and more particularly, to systems for misdirecting network security attacks on aircraft and other transport vehicles.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Airlines thus provide on-board in-flight entertainment (IFE) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

Although cabin-installed IFE systems remain a popular choice for passengers, an increasing number are choosing to bring on board their own portable electronic devices (PEDs) such as smart phones, media players, electronic readers, tablets, laptop computers, and so forth. These devices are typically loaded with music, video, games, and other multimedia content of the user's choosing, though such devices mostly fill the same role as IFE systems—to keep the user entertained and otherwise occupied during the flight.

However, there is also a demand on the part of some passengers to put PEDs to more productive uses, which typically require access to the Internet. For instance, PEDs may have installed thereon various e-mail and instant messaging client applications, stock trading applications, banking applications, file sharing applications, cloud-based notetaking applications, and countless other productivity software. Furthermore, there may be dedicated applications that have functions that are particularly useful during travel, such as trip and connecting flight/departure gate tracking. Also popular are applications that are not necessarily productivity-related but still require Internet access, such as sports score updates, text-based news, and so forth.

Internet access on flights is typically provided via an onboard WiFi network, to which the PEDs connect. In this regard, there may be several WiFi access points located throughout the cabin, each of which are connected to a satellite uplink module that is in communication with a satellite. The satellite, in turn, may be in communication with a ground station that is connected to the Internet.

In some IFE implementations, a PED can connect to the WiFi network without accessing the satellite-based Internet link. One application is the retrieval of multimedia content and related data (such as digital rights management keys needed for playback) from an onboard content server for consumption during flight via the PED. Along these lines, it may be necessary for the PED to access a login webpage on the local network, through which payment for the Internet access can be submitted, along with inputting an acceptance of the airline's and the datalink provider's terms and conditions, and so on, prior to being permitted access to the Internet. The WiFi access point may cooperate with a firewall that selectively restricts and permits access to the Internet from specific PEDs in accordance with the payment of the access/subscription fee.

Although the onboard data network accessible by passengers is typically limited to entertainment and Internet access functionalities without any crossover to flight safety critical avionics systems, a variety of operations-related systems are increasingly being connected. Such systems may be the target of hacking attacks from passengers. While attacks against the aforementioned payment processing and media content delivery systems may not result in an attacker taking control over the flight or safety systems, significant disruptions may nevertheless occur to services that passengers otherwise expect, thereby impacting the reputation of the carrier. Stored user accounts, passwords, and sensitive financial information, e.g., credit cards, may also be compromised because of the attack. Furthermore, to the extent attacks are directed to operations-related systems that are connected to the onboard network shared with passengers, flight operations may be impacted in the event of a security breach.

Accordingly, there is a need in the art for in-flight network security defense, and misdirecting security attacks directed against networked resources onboard an aircraft and other transport vehicles. There is also a need for honeypots, honeypits, tarpits, and honey files that can occupy the time and attention of an attacker that is connected to the network during the relatively short duration of a flight. Avionics systems are expensive to modify and are limited with respect to the memory, computing power, electrical power, and physical space that can be dedicated to such functions. Thus, there is a need for implementations of such misdirection systems that avoids and/or circumvents such constraints.

BRIEF SUMMARY

The present disclosure is directed to improving security in vehicle entertainment and communications systems by misdirecting attackers to a simulated system, also referred to as a honeypot. Such honeypots may be based on network services that represent likely targets like a secure shell (SSH) server, as gaining full access privileges thereto may potentially leave an entire system vulnerable. Upon unauthorized access to the simulated system, an immediate notification thereof may be triggered, notifying ground information security staff.

According to one embodiment, there is a system for misdirecting network security attacks onboard a vehicle. There may be a data networking interface connected to a local area network of the vehicle. One or more client devices may be connectible to the local area network. There may also be an onboard network service simulator connected to the data networking interface. The onboard network service simulator may accept incoming access requests accompanied by an access credential from an attacker client device. The onboard network service simulator may also be responsive to such incoming access requests. The system may also include a simulated service user interface that accepts command inputs corresponding to requests to access a simulated data set upon an acceptance of the access credential. There may also be an access attempt monitor that is in communication with the onboard network service simulator and the simulated service user interface. The access attempt monitor may capture a security breach event for each incoming access request to the onboard network service simulator and the command inputs for the requests to access the simulated data set.

Another embodiment of the present disclosure is a network security attack misdirection line replaceable unit for installation on an aircraft and connected to an onboard data network. The line replaceable unit may include a local network interface to the onboard data network. The line replaceable unit may also include a data processing device that executes a series of pre-programmed instructions of a local simulation server. According to various embodiments, the local simulation server may accept incoming access requests accompanied by an access credential from an attacker client device. Additionally, the local simulation server may be responsive to such incoming access request with either a simulated access denial response or a simulated access grant response. Delays between receipt of the access request and to the access denial response may be progressively increased with each presentation of an incorrect access credential from the attacker client device to the local simulation server. With the access grant response, the local simulation server may permit access to a simulated data set.

Yet another embodiment is directed to a system for misdirecting an attack originating from a node connected to a vehicle-based local network with a communications link to a remote network. The system may include a local network interface to the vehicle-based local network. There may also be a remote network interface that establishes the communications link between the vehicle-based local network and the remote network. The system may also include a local simulation server that accepts incoming local access requests accompanied by an access credential from the attacking node. The local simulation server may be responsive to the local access request with a simulated local access denial response of progressively longer delays between the accepting of the incoming local access requests. There may also be a remote simulation server that similarly accepts incoming remote access requests relayed through the remote network interface over the communications link. The remote simulation server may be responsive to the incoming remote access requests with a simulated remote access denial response of progressively longer delays between the accepting of the incoming remote access requests.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, and in which like numbers refer to like parts throughout, and in which.

DETAILED DESCRIPTION

The detailed description set forth below in connection with the appended drawings is intended as a description of the several presently contemplated embodiments of a system for misdirecting network security attacks on a transport vehicle. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second, local and remote, and the like are used solely to distinguish one from another entity without necessarily requiring or implying any actual such relationship or order between such entities.

Figure 1:
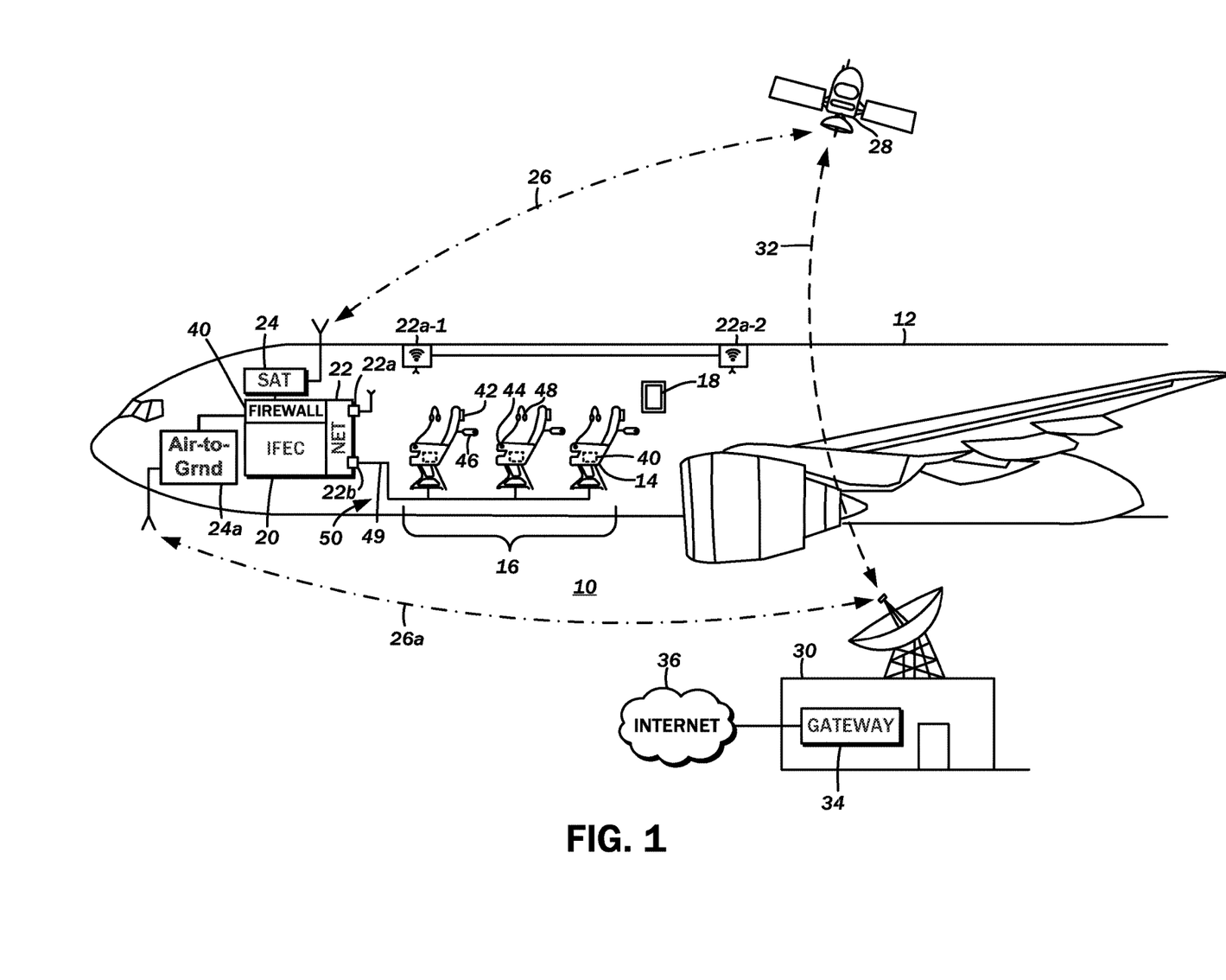
FIG. 1 is a diagram illustrating an environment in which the present system for misdirecting network security attacks may be implemented.

FIG. 1 is a simplified diagram of an aircraft 10, generally referred to herein as a vehicle, along with select subsystems and components thereof that are utilized in connection with the embodiments of the present disclosure. Within a fuselage 12 of the aircraft 10, there may be seats 14 arranged over multiple rows 16, with each seat 14 accommodating a single passenger. Although the features of the present disclosure will be described in the context of the aircraft 10 this is by way of example only and not of limitation. The presently disclosed system for dynamically implementing firewall exceptions may be utilized in any other context as appropriate.

One or more passengers may utilize a portable electronic device (PED) 18 during flight. For purposes of the present disclosure, PEDs 18 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

The aircraft 10 incorporates an in-flight entertainment and communications (IFEC) system 20. One of its components is a data communications module 22. Almost all conventional PEDs 18 have a WLAN (WiFi) module, so the data communications module 22 of the IFEC system 20 includes a WLAN access point 22a. The PED 18, via the onboard WLAN network, may connect to the IFEC system 20 to access various services offered thereon such as content downloading/viewing, shopping, and so forth. Typically, a single WLAN access point 22a is insufficient for providing wireless connectivity throughout the cabin, so additional WLAN access points 22*a*-1 and 22*a*-2 may be installed at various locations spaced apart from each other, and connected to the data communications module 22 over a wired link.

The IFEC system 20 may also offer Internet access to the connecting PEDs 18. One contemplated modality that operates with the IFEC system 20 is a satellite module 24 that establishes a data uplink 26 to a communications satellite 28. According to one exemplary embodiment, the data uplink 26 may be Ku-band microwave transmissions. However, any suitable communications satellite 28, such as Inmarsat or Iridium may also be utilized without departing from the present disclosure including other bands, such as Ka-band, C-band and/or X-band. The data transmitted to the communications satellite 28 is relayed to a satellite communications service provider 30. A data downlink 32 is established between the communications satellite 28 and the satellite communications service provider 30 that, in turn, includes a network gateway 34 with a connection to the Internet 36. As will be recognized by those having ordinary skill in the art, there are numerous servers that are accessible via the Internet 36, though in the various embodiments of the present disclosure. Internet access may also be provided via an air-to-ground module 24*a* communicating over a data link 26*a* directly between the vehicle 12 and a ground station. While a ground station may be provided on a marine vessel and/or at offshore locations, direct data links 26*a* between the vehicle 12 and a ground station are largely limited to journeys over land masses. Satellite links are typically a more expensive solution for providing Internet access, but advantageous for providing Internet access while traveling over large bodies of water beyond the range of a ground station. The present disclosure is applicable to systems including satellite data links, direct air-to-ground links, and/or other types of data links, for example vehicle-to-vehicle links, such as a mesh network.

The PED 18 is understood to connect to the IFEC system 20 via the WLAN access point 22*a*, which relays the data transmissions to the satellite module 24. The data is transmitted to the communications satellite 28 over the data uplink 26, and the satellite relays the data to the satellite communications service provider 30 over the data downlink 32. The network gateway 34 then routes the transmission to the Internet 36. Data transmissions from other nodes on the Internet 36 to the PED 18 are understood to follow a reverse course. Due to the high costs associated with the communications satellite 28 that is passed to the users of the data uplink 26 and the data downlink 32, the carrier may limit data traffic to and from the satellite module 24 with a firewall 38.

Another way in which the passenger can utilize the services offered through the IFEC system 20 are the individual seat-back modules that are typically comprised of a terminal unit 40, a display 42, an audio output 44, and a remote controller 46. For a given row 16 of seats 14, the terminal unit 40 and the audio output 44 are disposed on the seat 14 for which it is provided, but the display 42 and the remote controller 46 may be disposed on the row 16 in front of the seat 14 to which it is provided. That is, the display 42 and the remote controller 46 are installed on the seatback of the row in front of the seat. This is by way of example only, and other display 42 and remote controller 46 mounting and access configurations such as a retractable arm or the like mounted to an armrest of the seat 14 or by mounting on a bulkhead.

The display 42 is understood to be a conventional liquid crystal display (LCD) screen or other type with a low profile that is suitable for installation on the seatback. Each passenger can utilize an individual headset 48, supplied by either the airline or by the passenger, which provides a more private listening experience. In the illustrated embodiment, the audio output 44 is a headphone jack that is a standard ring/tip/sleeve socket. The headphone jack may be disposed in proximity to the display 42 or on the armrest of the seat 14 as shown. The headphone jack may be an active type with noise canceling and including two or three sockets or a standard audio output without noise canceling. It is also possible to utilize short-range wireless transmission/connectivity systems such as Bluetooth to connect the headset 48 to the terminal unit 40. In alternate embodiments, each display 42 may incorporate a terminal unit 40 to form a display unit referred to in the art as a smart monitor.

A common use for the terminal unit 40 installed on the aircraft is the playback of various multimedia content. The terminal unit 40 may be implemented with a general-purpose data processor that decodes the data files corresponding to the multimedia content and generates video and audio signals for the display 42 and the audio output 44, respectively. The multimedia content data files may be stored in one or more repositories associated with the IFEC system 20, and each of the terminal units 40 for each seat 14 may be connected thereto over a wired local area network link 49, which may preferably be Ethernet. In addition to the aforementioned data communications module 22 that includes the access point for PEDs 18, there is an Ethernet data communications module 22*b*. More particularly, the Ethernet data communications module 22*b* is understood to be an Ethernet switch or a router.

Under the most common usage scenarios, the terminal units 40 initiate a request for multimedia content to the IFEC system 20, where such content is stored. The data is transmitted to requesting terminal unit 40 over the wired local area network link 49, and most data traffic thus remains local. However, there are several additional applications contemplated that may rely upon a connection to the Internet 36, in which case the data is passed to the satellite module 24 so long as permission has been granted therefor by the firewall 38 in the same manner as described above in relation to the WLAN network and the request originating from the PED 18.

The data communications module 22 is thus understood to encompass the hardware components such as the aforementioned WLAN transceiver 22*a* and the Ethernet router/switch 22*b*. Additionally, the data communications module 22 is intended to include the software drivers that interface the hardware components to the other software modules of the IFEC system 20. Along these lines, while a segment of the network defined by the WLAN access point 22*a* is separate from that which is defined by the Ethernet data communications module 22*b*, the combined segments may be generally referred to as the onboard local area network 50.

Although most passengers connect to the onboard local area network 50 without any ill-intent, there may be some that attempt to access restricted segments/services for malicious purposes such as obtaining sensitive data and disrupting and/or taking control over those services. Typically, flight-critical avionics systems are physically separate from the onboard local area network 50 carrying passenger data traffic, some aircraft systems may be utilize the onboard local area network 50 for administrative or maintenance purposes. Whether done for financial profit or for entertainment/thrill-seeking, attacks against resources connected to the onboard local area network 50 are problematic for carriers, and so the present disclosure contemplates various systems for misdirecting such network security attacks.

Figure 2:
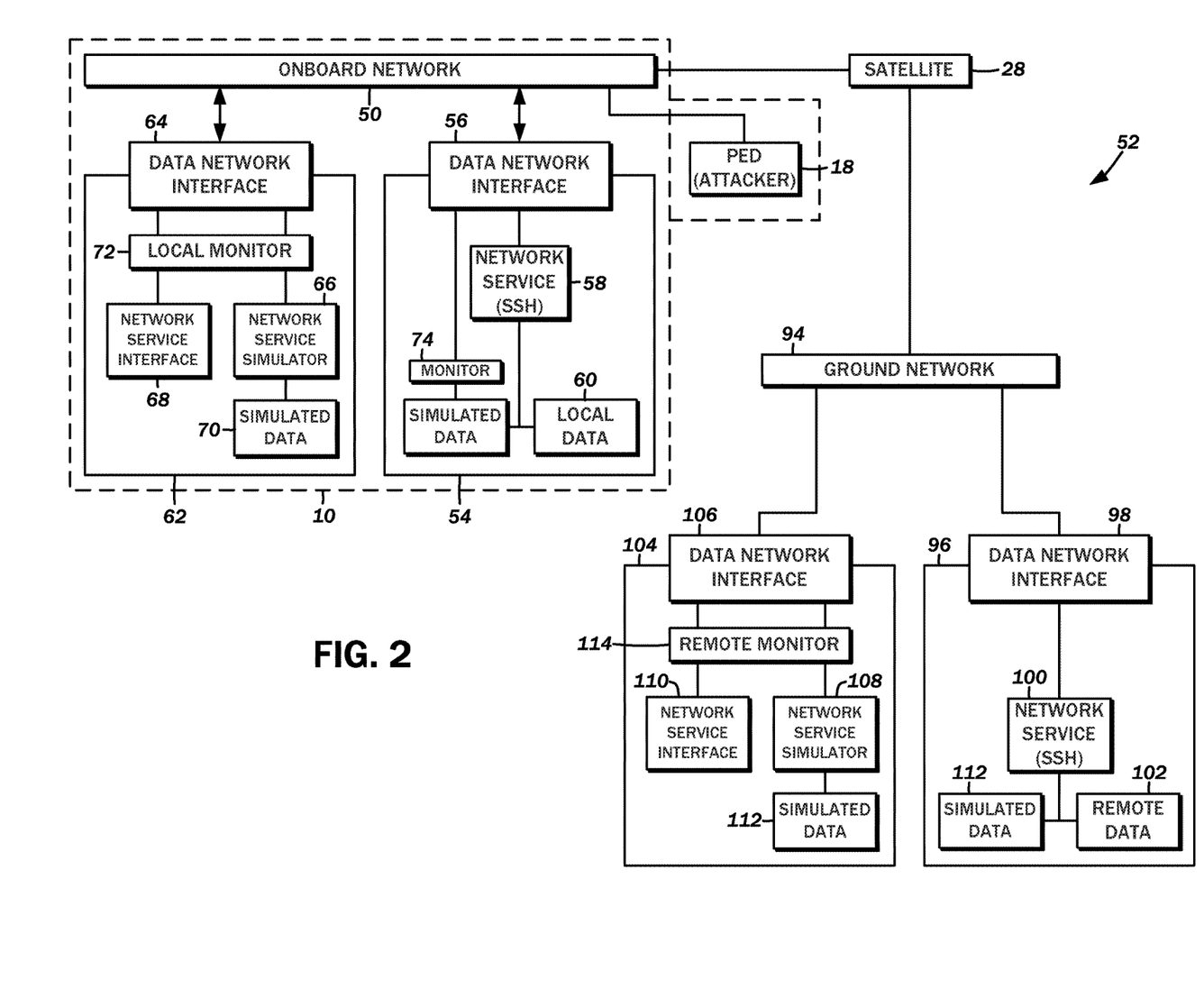
FIG. 2 is a block diagram of the system for misdirecting network security attacks in accordance with one embodiment.

The block diagram of FIG. 2 illustrates one embodiment of a system 52 for misdirecting network security attacks that may originate from a passenger PED 18 onboard the aircraft 10. The system 52 may also be referred to variously as a honeypot or a tar pit, as it is configured to attract and redirect attacks against operational services connected to the onboard local area network 50, all the while responding slowly to each access attempt with the objective of slowing down the attacker. Even the longest long-haul international flights are under twenty hours in duration, with most being but a fraction thereof and being substantially less than other systems in which attack efforts can be made over the course of multiple days and weeks, if not months, or even years. It is contemplated any and all delay strategies misdirecting a passenger-attacker away from the onboard local area network 50 and its resources is worthwhile because that time and effort is not being directed thereto. The system 52 is thus envisioned to induce additional time and expense for a successful attack, and completion may become infeasible over a typical roundtrip journey.

As discussed above, the aircraft 10 is equipped with the onboard local area network 50, to which one or more passenger PEDs 18 may connect to communicate with, for example, the IFEC system 20 or to the Internet 36 via the communications satellite 28. In the illustrated example, the PED 18 may be that of an attacker and is being used to breach the security of the connected avionics system and gain access thereto. Depicted broadly in the block diagram of FIG. 2 is an avionics system 54 connected to the onboard local area network 50. The avionics system 54 may include a data network interface 56, which is understood to encompass the hardware and software components utilized to connect the avionics system 54 to the onboard local area network 50. One example of the avionics system 54 is the IFEC system 20, but is not limited thereto. Others include flight operations management systems that assist flight deck, cabin, and ground crew with operational and maintenance procedures, and report information to the ground support centers.

In further detail, the avionics system 54 includes a local network service 58, which is understood to refer to the network service or resource accessible from a client that is connected to the onboard local area network 50. The local network service 58 may be, for example, a secure shell (SSH) server that provides a command line interface from which different application programs may be invoked and executed. Other network services include file sharing/file serving, instant messaging, electronic mail, web/HTTP (hypertext transfer protocol) serving, among others. Associated with or otherwise accessible via the local network service 58 may be local data 60. In the context of the secure shell server, the local data 60 may be various files that are stored within a file system of the avionics system 54.

Access to the local network service 58 and the local data 60 may be limited to users having proper access credentials, such as, for example, a username and a password. The validation of more sophisticated access credentials such as one-time codes or biometrics may also be required before access to the local network service 58 is permitted. The access credentials may be provided via a terminal or command line interface which prompts the user to key the required data. However, this is by way of example only and not of limitation, and other modalities for providing access credentials may be substituted.

According to various embodiments, also connected to the onboard local area network 50 is a local simulated server 62 that is envisioned to mimic, but is not utilized to provide, an actual network service unlike the avionics system 54. The local simulated server 62 includes a data network interface 64 that, like the data network interface 56, includes hardware and software components for connecting to the onboard local area network 50. The local simulated server 62 includes an onboard network service simulator 66 connected to the data network interface 56 and accepts incoming access requests that are accompanied by an access credential from the attacking PED 18. As will be described in further detail below, the onboard network service simulator 66 may respond in various ways that misdirects the attacker from the live, local network service 58.

The onboard network service simulator 66 may be configured as a so-called "tarpit," where each attempt to access the local simulated server 62, that is, each time an incorrect access credential is presented from the attacking PED 18, the response indicating that the access credentials is incorrect, is provided following a predetermined delay. This delay may be progressively increased with each access attempt. This is contemplated to waste an attacker's time, which in the context of an airline flight, is somewhat limited, as explained above. Every delay that is imposed on the attacker is understood to decrease the likelihood of a successful attack.

By way of example, the onboard network service simulator 66 may mimic an SSH terminal/server. With such an implementation, there may additionally be a network service interface 68 that accepts command inputs and generates responses thereto. One command input may be a request for data, e.g., simulated data 70 that may appear to the attacker to include sensitive account/password data, financial records including credit card information and accompanying personal information, and the like. Access to the simulated data 70 via the terminal or network service interface 68 may eventually be provided after a number of failed access attempts, regardless of what access credentials are provided. Allowing access to the simulated data 70 is contemplated to further misdirect and divert the time and attention of the attacker away from the local network service 58.

All interactions between the attacker and the local simulated server 62 may be monitored and logged by an access attempt monitor, also referred to as a local monitor 72. In this regard, the local monitor 72 may be communicatively linked with the network service interface 68 and the onboard network service simulator 66, and logs a security breach event for each incoming access request to the onboard network service simulator 66. Additionally, requests for the simulated data 70 via the onboard network service simulator 66 may likewise be logged as a security breach event. Such logged security breach events may be immediately transmitted to a ground-based security administrator associated with the satellite communications service provider 30. Because of the captive nature of the passengers on the aircraft 10, security and/or law enforcement personnel may be dispatched to the destination well ahead of arrival.

In addition to misdirecting an attacker to the simulated data 70 through local simulated server 62, the avionics system 54 may also be loaded with the simulated data 70. Should the attacker succeed in breaching the existing security of the avionics system 54, a misdirection to the simulated data 70 may prevent damaging actions being taken in relation to the avionics system 54. The simulated data 70 may be stored in locations that are typically not accessed during routine use of the avionics system 54. There may be a monitor 74 that logs any access or data retrieval or replication attempts at these locations, and trigger an alarm in response thereto. In at least some configurations of the system, the attacker is permitted to download some or all of the simulated data 70 from the simulated server 62 and/or the avionics system 54. The simulated data 70 may include forensic and tracking information embedded in the simulated data, such as beacons or unique identification characteristics enabling remote tracking of the simulated data after it is downloaded. Forensic and tracking information embedded in the simulated data aids in pursuit and identification of attackers.

Figure 3:
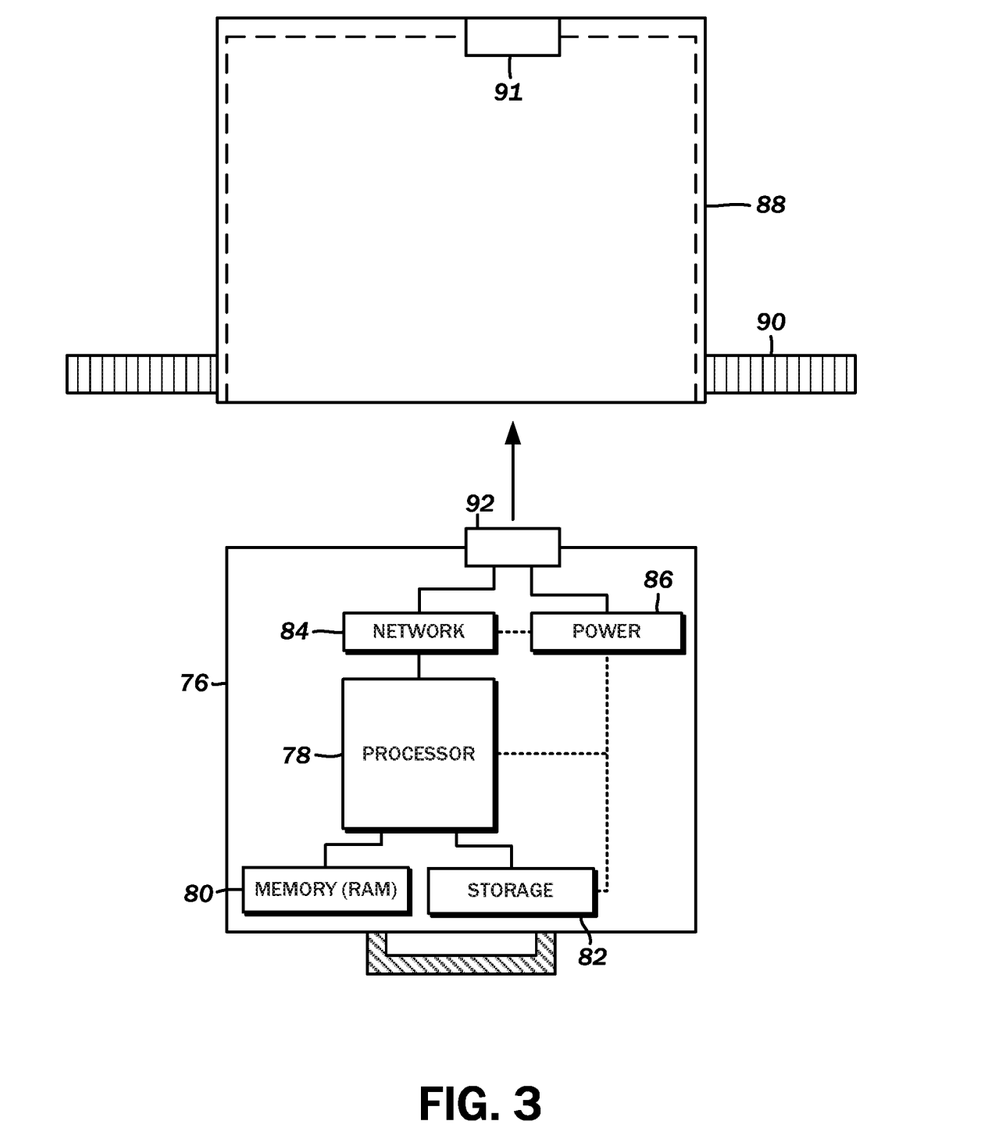
FIG. 3 is diagram illustrating the components of a line replaceable unit that is one embodiment of the system for misdirecting network security attacks.

Referring to the diagram of FIG. 3, the aforementioned local simulated server 62 may be implemented as a line-replaceable unit 76. In general, the hardware components of local simulated server 62 are of a conventional server computer system, e.g., a processor 78 with memory 80 to temporarily store data and software instructions to be executed by the processor 78, and a storage device 82 for long-term storage of the same. The software instructions executed by the processor 78 are understood to be those of the local simulated server 62, as well as underlying operating system software, driver software, and so on. There may also be a network interface card 84 that connects to the onboard local area network 50. Power and grounding for the electrical components may be provided by a power supply 86. These basic components may be mounted to and interconnected with a motherboard (not shown), with such circuit board being housed in an enclosure.

The line-replaceable unit 76 is configured for modularity and simple and fast replacement. To this end, the physical form factor of the enclosure, as well as the electrical interconnects are understood to be standardized. Several such standards are widely used in aircraft-installed line replaceable units, including ARINC (Aeronautical Radio, Incorporated) 700-series standards. There are a variety of mount points for line-replaceable units within the fuselage 12 of the aircraft 10. Each line-replaceable unit 76 is understood to be mounted to an individual tray 88, with multiple trays being secured to an attachment structure 90. Those having ordinary skill in the art will recognize the different possible structures on which a cabinet of trays may be mounted.

The tray 88 is likewise sized and configured to accept the line-replaceable unit 76. The network connection and the power connection, and any other interconnects between the line-replaceable unit 76 and the tray 88 may be consolidated into a single socket 91 and plug 92 with multiple lines that each correspond to a specific interconnection. A variety of standards also govern the configuration of such sockets 9 and plugs 92, and it will be appreciated that any one may be utilized.

Several advantages are envisioned for implementing the local simulated server 62 as a standalone line-replaceable unit 76. In a typical installation of the IFEC system 20, there may be number of open trays 88 with which a dedicated line-replaceable unit 76 for the local simulated server 62 can be accommodated, instead of reconfiguring existing components of the IFEC system 20 to implement the local simulated server 62. Additionally, in the event of a failure, or attracts numerous attack attempts, being implemented separately from the other parts of the IFEC system 20 helps isolate the local simulated server 62 and substantially diminishes the safety impact on the aircraft 10. Alternatively, the line-replacement unit 76 may be configured as a system running on a virtual machine on the IFEC system 20. This has the advantage of requiring less hardware, while isolating the simulated line-replacement unit 76 in a virtual operating environment away from the actual system. VirtualBox VMWare, QEMU or other known virtualization applications may be used to configure the line-replacement unit 76 as a system running on a virtual machine.

Referring back to the block diagram of FIG. 2, it is possible for the attacker to go beyond the onboard local area network 50 in search of other systems to breach. As discussed above, the aircraft 10 may be equipped with the satellite communications module 24 that establishes a link to the ground station or satellite communications service provider 30 via the communications satellite 28. The ground station has a ground network 94 to which various active network services are connected. By way of example, this may be a remote server 96 with a data network interface 98 connecting the remote server 96 to the ground network 94. The remote server 96 includes a remote network service 100, one example of which is another SSH server with a command line interface from which other software applications to retrieve and manipulate files stored on the filesystem, e.g., remote data 102. Access to the remote network service 100 and the remote data 102 may be limited to users having proper access credentials, such as the aforementioned username and password combination.

A ground-based, remote simulated service 104 is envisioned to misdirect the attacker away from the remote server 96. It is possible for an attacker on the aircraft 10 to connect to the onboard local area network 50, then attempt to connect to nodes on the ground network 94, or in the alternative, other aircraft by subsequently connecting to a different onboard local area network from the ground network 94. The remote simulated service 104 may also invite attacks from other ground-based attackers connecting from the Internet 36.

Similar to the local simulated server 62, the remote simulated service 104 has hardware and software components for connecting to the ground network 94, which may be generally referred to as the data network interface 106. The remote simulated service 104 likewise includes a remote network service simulator 108 connected to the data network interface 106 and accepts incoming access requests that are accompanied by an access credential from the attacking PED 18.

The remote network service simulator 108 may be configured as a tar pit in which attempts to access the same is met with a response indicating that the access credentials is incorrect, following a predetermined delay. This delay may be progressively increased with each access attempt. This distracts and forces the attacker to waste limited available time, and each delay is contemplated to reduce the chances of success.

The remote network service simulator 108 may also mimic an SSH terminal/server, and so there is understood to be a remote network service interface 110 that accepts command inputs and generates responses thereto. One command input may be a request for data, e.g., simulated data 112 that may appear to the attacker to include sensitive data but is, in actuality, fake. Access to the simulated data 112 via the terminal or remote network service interface 110 may eventually be provided after a number of failed access attempts, which may further misdirect and divert the time and attention of the attacker.

All interactions between the attacker and the remote network service simulator 108 may be monitored and logged by a remote monitor 114 that is connected to the remote network service interface 110 and the remote network service simulator 108. Requests for the simulated data 112 via the remote network service simulator 108 may be logged as a security breach event. Such logged security breach events may be used to alert the ground-based security administrator. The simulated data 112 may be stored and accessible from the remote network service 100, but is otherwise stored in a location not typically accessed during normal use. A separate monitor may review access to this filesystem location, and appropriately log any attempts as potential security breaches.

In accordance with a preferred, though optional embodiment, the remote simulated service 104 may be utilized in conjunction with the local simulated server 62. Without the local simulated server 62, the attacker would be more likely to direct efforts against the remote simulated service 104, and generate costly additional satellite data traffic. Furthermore, the additional time necessary to transmit commands and other data relating to the attack, and then transmit the response thereto, i.e., the round trip packet delay caused by the satellite links, the efforts to misdirect the attacker may be insufficient, as it will be easier to deduce that the target system is not onboard the aircraft 10. However, it is expressly contemplated that the local simulated server 62 may be deployed by itself without the remote simulated service 104.

The particulars shown herein are by way of example only for purposes of illustrative discussion, and are presented in the cause of providing what is believed to be the most useful and readily understood description of the principles and conceptual aspects of the various embodiments of the system for misdirecting network security attacks set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A system for misdirecting network security attacks onboard a vehicle, comprising:
    a local simulated server including a data networking interface connected to a local area network of the vehicle,
    wherein the local simulated server is based onboard the vehicle, and wherein the local simulated server comprises a processor and a memory storing instructions, that when executed by the processor, causes the local simulated server to execute:
        an onboard network service simulator connected to the data networking interface, the onboard network service simulator configured to accept incoming access requests accompanied by an access credential from an attacker client device and being responsive thereto; and
        a simulated service user interface configured to accept command inputs corresponding to requests to access a simulated data set upon an acceptance of the access credential; and
    a remote simulated server that is ground based, the remote simulated server comprising a processor and a memory storing instructions, that when executed by the processor, causes the remote simulated server to execute:
        a remote network service simulator in communication with the data networking interface, the remote network service simulator configured to accept incoming remote access requests accompanied by a remote access credential from the attacker client device and being responsive thereto with a simulated remote access denial response;
        an access attempt monitor in communication with the onboard network service simulator and the simulated service user interface, the access attempt monitor configured to capture a security breach event for each incoming access request to the onboard network service simulator and the command inputs corresponding to the requests to access the simulated data set; and
        a remote monitor in communication with the remote network service simulator, the remote monitor configured to log requests to access a remote simulated data set as remote security breach events.

2. The system of claim 1, wherein the onboard network service simulator is responsive to the incoming access requests with either a simulated access denial response or a simulated access grant response, delays between receipt of the access request to presentation of the access denial response being progressively increased with each presentation of an incorrect access credential from the attacker client device to the onboard network service simulator, and with the access grant response, permitting access to the simulated data set.

3. The system of claim 1, further comprising an avionics system implementing one or more monitors of corresponding authentic network services connected to the local area network, legitimate and malicious access attempts to one of the authentic network services being tracked by the one or more monitors, said one or more monitors collecting records of monitored events for later retrieval from the vehicle.

4. The system of claim 3, wherein the simulated data set is accessible from the authentic network services.

5. The system of claim 1, wherein delays between receipt of the remote access requests to presentation of the remote access denial response are progressively increased with each presentation of an incorrect remote access credential from the attacker client device to the remote network service simulator.

6. The system of claim 1, wherein the simulated data set includes account and password data.

7. The system of claim 1, wherein the simulated data set includes financial account data.

8. The system of claim 1, wherein the onboard network service simulator mimics a secure shell (SSH) server.

9. The system of claim 1, wherein the data networking interface and the onboard network service simulator are implemented in a standalone line replaceable unit.

10. A method of misdirecting network security attacks onboard a vehicle, comprising:
    accepting, by an onboard network service simulator that is based onboard the vehicle and connected to a data networking interface in communication with a local area network of the vehicle, incoming access requests accompanied by an access credential from an attacker client device;
    accepting, by a simulated service user interface, command inputs corresponding to requests to access a simulated data set upon acceptance of the access credential;
    accepting, by a remote network service simulator that is ground based and connected to the data networking interface, incoming remote access requests accompanied by a remote access credential from the attacker client device and being responsive thereto with a simulated remote access denial response;

capturing, by an access attempt monitor in communication with the onboard network service simulator and the simulated service user interface, a security breach event for each incoming access request to the onboard network service simulator and the command inputs corresponding to the requests to access the simulated data set; and logging, by a remote monitor in communication with the remote network service simulator, requests to access a remote simulated data set as remote security breach events.

11. The method of claim 10, further comprising:

presenting, by the onboard network service simulator in response to the incoming access requests, either a simulated access denial response or a simulated access grant response, delays between receipt of the access request and presentation of the access denial response being progressively increased with each presentation of an incorrect access credential from the attacker client device to the onboard network service simulator, and with presentation of the access grant response, permitting access to the simulated data set.

12. The method of claim 10, further comprising:
tracking, by one or more monitors of authentic network services connected to the local area network, legitimate and malicious access attempts to the authentic network services; and collecting, by the one or more monitors, records of monitored events for later retrieval from the vehicle.

13. The method of claim 12, wherein the simulated data set is accessible from the authentic network services.

14. The method of claim 10, wherein delays between receipt of the remote access requests to presentation of the remote access denial response are progressively increased with each presentation of an incorrect remote access credential from the attacker client device to the remote network service simulator.

15. The method of claim 10, wherein the simulated data set includes account and password data.

16. The method of claim 10, wherein the simulated data set includes financial account data.

17. The method of claim 10, wherein the onboard network service simulator mimics a secure shell (SSH) server.

18. The method of claim 10, wherein the data networking interface and the onboard network service simulator are implemented in a standalone line replaceable unit.

* * * * *